(No Model.)

C. BENAVIDES & J. P. ARTHUR.
Animal Shears.

No. 238,080.  Patented Feb. 22, 1881.

WITNESSES:
Chas. Nida
C. Sedgwick

INVENTOR:
C. Benavides
J. P. Arthur
BY Munn & Co.
ATTORNEYS.

UNITED STATES PATENT OFFICE.

CRISTOBAL BENAVIDES AND JOSHUA P. ARTHUR, OF LAREDO, TEXAS.

ANIMAL-SHEARS.

SPECIFICATION forming part of Letters Patent No. 238,080, dated February 22, 1881.

Application filed August 31, 1880. (No model.)

*To all whom it may concern:*

Be it known that we, CRISTOBAL BENAVIDES and JOSHUA P. ARTHUR, of Laredo, in the county of Webb and State of Texas, have invented a certain new and useful Improvement in Sheep-Shears, of which the following is a specification.

Figure 1:
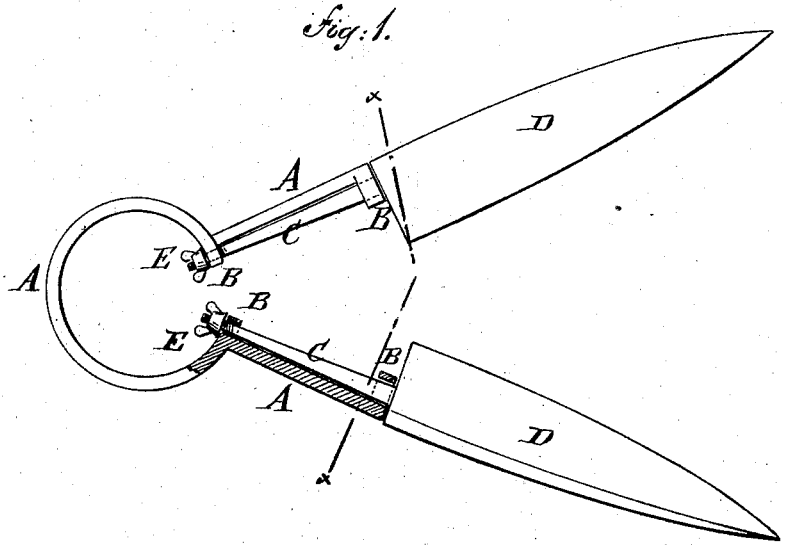
Figure 2:
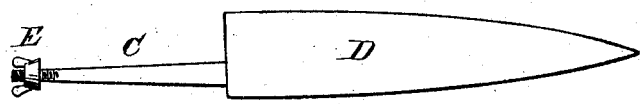
Figure 3:
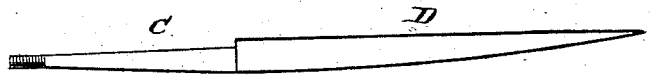
Figure 4:

Figure 1 is a plan view, partly in section, of the improvement. Fig. 2 is a plan view of one of the blades. Fig. 3 is a rear-edge view of one of the blades. Fig. 4 is a cross-section taken through the lines $x\ x$, Fig. 1.

Similar letters of reference indicate corresponding parts.

The object of this invention is to furnish sheep-shears so constructed that the blades shall be separable from the handle.

A represents the handle of the shears, which is made with a central spring in the usual manner. Upon the outer and inner ends of the inner sides of the arms of the handle A are formed eyes or sockets B to receive the shanks C of the blades D. The apertures of the eyes B are made square and slightly tapering, and the shanks C are made square and slightly tapering, so that when the said shanks have been drawn snugly into the said eyes the blades D will be held firmly and rigidly. Upon the ends of the shanks C are cut screw-threads to fit into the screw-threads of the hand-nuts E, so that the shanks C can be drawn snugly into the eyes B and held securely by screwing up the nuts E. The backs of the blades D project a little beyond the shanks C to form shoulders to rest against the ends of the arms of the handle A, so that the backs of the blades and of the arms of the handles will be in line and will form smooth surfaces. The blades D are made of the usual form.

With this construction the blades can be easily detached when they require to be sharpened, so that they can be sharpened without grinding off or rounding their points and corners, and without any danger of breaking the spring of the handle, as frequently happens when the shears are made in the usual manner.

Having thus described our invention, we claim as new and desire to secure by Letters Patent—

In sheep-shears, the combination, with the arms of the handle A and the separate blades D, of the eyes B, having square tapering apertures, the square tapering shanks C of the blades D, having screw-threads, and the hand-nuts E, substantially as herein shown and described, whereby the blades can be readily attached and detached, as set forth.

CRISTOBAL BENAVIDES.
JOSHUA P. ARTHUR.

Witnesses:
O. P. REID,
SANTOS BENAVIDES, Jr.